United States Patent
Remblad

(10) Patent No.: US 7,225,483 B1
(45) Date of Patent: Jun. 5, 2007

(54) COMBINATION BEACH BAG AND BEACH MAT

(76) Inventor: Diane Remblad, P.O. Box 719, Glendale, RI (US) 02826

( * ) Notice: Subject to any disclaimer, the term of this patent is extended or adjusted under 35 U.S.C. 154(b) by 0 days.

(21) Appl. No.: 11/164,424

(22) Filed: Nov. 22, 2005

(51) Int. Cl.
*A47G 9/06* (2006.01)

(52) U.S. Cl. .................................. 5/417; 5/419; 383/4

(58) Field of Classification Search ............ 5/417–420; 383/4
See application file for complete search history.

(56) References Cited

U.S. PATENT DOCUMENTS

| | | | |
|---|---|---|---|
| 4,687,248 A | | 8/1987 | Ross et al. |
| 5,299,337 A | | 4/1994 | Venza |
| 5,439,405 A | | 8/1995 | Storey et al. |
| 5,460,426 A | | 10/1995 | Tribelsky et al. |
| 5,588,696 A | | 12/1996 | Jay et al. |
| 5,774,912 A | * | 7/1998 | Dominique .................... 5/419 |
| 5,785,427 A | | 7/1998 | Godshaw |
| 6,493,891 B1 | * | 12/2002 | Livingston ..................... 5/636 |
| 6,839,921 B2 | * | 1/2005 | Cloutier et al. ................. 5/417 |
| 6,952,845 B1 | * | 10/2005 | Akkad ............................ 5/419 |
| 7,076,816 B1 | * | 7/2006 | Nielsen et al. ................. 5/417 |
| 2002/0084197 A1 | * | 7/2002 | Carbonneau ................ 206/216 |

\* cited by examiner

*Primary Examiner*—Michael Trettel
(74) *Attorney, Agent, or Firm*—Theresa M. Seal

(57) ABSTRACT

A combination beach bag and beach mat for storing and transporting personal items for leisure, camping, travel, vacation, swimming pool and beach going excursions includes an upper storage section having an inner storage cavity for containing a towel and a beach mat therein, and the beach mat integrally attached to the storage section and easily drawn out and unfolded from the inner storage cavity for disposition on the ground or for covering various types of chairs, and both the storage section and the beach mat having integrally attached thereto accessory pouches or pockets that can be insulated for the storage of other items such as keys, wallets, reading material, and beverage containers. The beach mat and the accessory pouches are easily folded back into the inner storage cavity of the upper storage section whereupon the upper storage section functions as a beach bag for convenient transport by draping a carrying strap attached to the upper storage section over the individual's shoulder.

15 Claims, 5 Drawing Sheets

COMBINATION BEACH BAG AND BEACH MAT

The present invention pertains to leisure and vacation accessories for beach, pool, camping and vacation situations, and more particularly pertains to a portable, lightweight, multi-purpose beach bag and beach mat.

BACKGROUND OF THE INVENTION

There is a wide range of accessories available for enhancing the comfort, ease, and pleasure of outdoor, leisure activities and excursions. Such activities and excursions can include camping, hiking, backpacking, picnics, amusement and water park jaunts, and both outdoor and indoor pool and beach swimming, sun tanning and relaxation. Such accessories that accompanying aquatic-type excursions can include beach chairs, floating chairs, beach balls, loungers, recliners, coolers, submergible flotation devices, inflatable and non-submersible flotation devices, tote bags, towels, a change of clothes, Frisbees, umbrellas, and toys such as pails, buckets, and shovels. Transporting such paraphernalia from a car, SUV or bathhouse to the beach or swimming pool area can prove quite a challenge, especially if it involves a family with small children. The children are generally unable to carry many of the above items; it is left for the parents to make a number of back and forth trips to place all the accessories on the beach or on deck chairs that surround the motel swimming pool. In many cases the swimming pool or beach may be separated from the parking lot by hundreds of feet, and transporting all the desired leisure and outdoor accessories, especially in hot summer weather, is an unpleasant task that can sour even the most upbeat vacationer or beach aficionado. This problem is further compounded if a mother is taking children that include a small baby to the local public swimming pool or public beach. Transporting even some of the above paraphernalia while carrying a baby is an onerous task, and since the baby cannot be left alone, the mother will have to carry the baby to the vehicle when retrieving all of the accessories, toys and infant essentials; and then the mother will have to balance the accessories, toys and infant essentials and the baby in the trip back to the beach or swimming pool. Given the aforementioned problems, it would be desirable to have some way to carry a number of items in a convenient and compact manner. In addition, it would be desirable for the carrying or transport device to be a multi-purpose device to increase its usefulness. Thus, the prior art discloses a number of devices that are convertible from one function to another, and are primarily used in outdoor, leisure and recreation activities and excursions.

For example, the Ross et al. patent (U.S. Pat. No. 4,687,248) discloses a convertible lounge chair/tote bag that includes back, base and leg supports supported on foldable legs, and which can be folded up into a tote bag for carrying and storage.

The Venza patent (U.S. Pat. No. 5,299,337) discloses a portable beach lounge that includes hingabley connected carrying containers that form the chair and a foldable canopy assembly for disposition above the individual's head.

The Storey et al. patent (U.S. Pat. No. 5,439,405) discloses a combination tote bag, semi-submersible floating chair/recliner and beach chair/pad that includes a number of interconnected buoyant cushioned sections so that the individual can float in a semi-flat or sitting disposition.

The Tribelsky et al. patent (U.S. Pat. No. 5,460,426) discloses a combination carrying case and folding seat that includes a first articulated section and a second articulated section pivotally interconnected by an elongated bottom enclosure wherein the articulated sections can be brought together for carrying and portability.

The Jay et al. patent (U.S. Pat. No. 5,588,696) discloses a convertible chair with arm rests that convert to a backpack that includes an assembly that converts to a beach-type chair and has webbing material for the storage of items therein.

The Godshaw patent (U.S. Pat. No. 5,785,427) discloses a convertible seat and tote bag that includes a pair of foldable panels that are interconnected by a supporting member that restrain the individual when one of the panels is used as a chair back, and a pair of side flaps that convert the device to a tote bag.

Despite the ingenuity of the above devices, their remains a need for a portable combination leisure, vacation, and beach accessory that can be used to store and carry items and also used as a mat or a seat or chair cover.

SUMMARY OF THE INVENTION

The present invention comprehends a lightweight, portable, multi-purpose leisure, vacation, beach and pool accessory that conveniently carries personal items and effects and is primarily used in outdoor activities that include, but are not limited to, camping, hiking, vacationing, pool, and beach bathing and relaxation. The multi-purpose accessory can be rolled and folded up for compact transport and storage, and allows the individual to be organized and ready to go on such outdoor activities and excursions on very short notice. Moreover, the multi-purpose accessory is easily and quickly deployed upon a surface such as the ground, beach, outdoor deck, or upon various types of chairs and lounges thereby providing a soft, comfortable, and dry covering for the individual to sit, rest or repose upon.

More specifically, the multi-purpose accessory of the present invention is a combination beach bag and beach mat that includes an upper storage section having an inner storage cavity and a closure means such as a zipper for closing the inner storage cavity. In addition, the beach mat is stored within the inner storage cavity and integrally attached to an inner surface of the upper storage section. The upper storage section includes a slot through which the beach mat is unfolded for disposition on, for example, a beach, deck chair or chaise lounge. The beach mat is drawn back through the slot for folding and containment within the inner storage cavity when not in use. The upper storage section also includes a carrying strap so that when the beach mat is stored within the inner storage cavity, the upper storage section effectively functions as a beach bag for containing and carrying various personal items and effects in a compact and convenient manner.

The combination beach bag and beach mat includes a number of accessory pouches and pockets for the storage of items ranging from car keys, cigarettes, wallets, and cellular phones to matches, sunscreen, suntan lotion, snacks and reading material. In the preferred embodiment a pair of accessory pockets are attached to the upper storage section and a second pair of accessory pockets are attached to the beach mat; and one or more pockets can be insulated for storing beverages therein. At least one towel is contained within the inner storage cavity of the upper storage section, and the towel can double as a pillow. The material from which the combination beach bag and beach mat is manufactured is preferably a quilted fabric that is comfortable, durable and washable.

It is an objective of the present invention to provide a combination beach bag and beach mat wherein the beach bag and beach mat are integrally connected and combined in one structure.

It is another objective of the present invention to provide a combination beach bag and beach mat that includes a towel that is stored therein and used as a pillow.

It is yet another objective of the present invention to provide a combination beach bag and beach mat that is lightweight, portable, durable and easily washable.

It is still yet another objective of the present invention to provide a combination beach bag and beach mat that includes a number of adjunct pockets and pouches for the storage of personal effects and belongings such as combs, suntan lotion, reading material, car keys, cellular phones, money, cigarettes, sunglasses, sunscreen lotion, and wallets.

It is a further objective of the present invention to provide a combination beach bag and beach mat wherein the beach mat can be draped over a chaise lounge, deck chair, wooden porch chair, or lawn chair to cover such chairs and provide a comfortable surface to sit and recline upon.

It is still yet another objective of the present invention to provide a combination beach bag and beach mat in which all beach, leisure, camping and vacation items can be consolidated in one bag.

A further objective of the present invention is to provide a combination beach bag and beach mat wherein the beach mat can be laid upon the ground for the individual to repose thereupon.

A still further objective of the present invention is to provide a combination beach bag and beach mat that can be neatly folded up for storage and travel, and organizes an individual's personal effects and belongings for prompt travel and movement.

Another objective of the present invention is to provide a combination beach bag and beach mat that is composed of a fabric that is comfortable to rest and lay upon.

Still another objective of the present invention is to provide a combination beach bag and beach that is adorned or decorated with striking designs and colors that reflect a certain theme or organization such as seasonal, sports or entertainment themes.

These and other objects, features, and advantages will become apparent to those skilled in the art upon a perusal of the following detailed description read in conjunction with accompanying drawing figures and appended claims.

DETAILED DESCRIPTION OF THE PREFERRED EMBODIMENT

Illustrated in FIGS. 1-6 is a lightweight, portable, durable, multi-purpose leisure, travel, and beach accessory 10 for storing and transporting a variety of items, belongings, and personal effects used in and that accompany primarily outdoor leisure, vacation and recreation activities, including, but not limited to, hiking, camping, bicycling, excursions to amusement parks and water parks, and relaxation by any swimming pool (indoor or outdoor), or beach. The accessory 10 of the present invention is primarily intended for carrying and storing items that an individual 12 or family would take to a public swimming pool, indoor or outdoor motel swimming pool, or any beach. The accessory 10 provides the individual 12 with a way to organize, store, and transport the various items in a compact and convenient manner. Among the items that can be stored and carried in the accessory 10 are wallets, cigarettes, shoes, sandals, suntan lotion, sunscreen lotion, reading material, infant wipes, Kleenexes, snacks, matches, cellular telephones, combs, car keys, sunglasses, money, towels, water bottles, beverages and wet wipes. The above items are typical items that would be taken on any outdoor excursion or activity, and especially an excursion or trip to a swimming pool or beach for relaxation, swimming and sun tanning. In addition to storing and carrying the above items, the multi-purpose leisure and recreation accessory 10 also serves as a cover that can be placed on the ground or upon deck chairs, beach chairs, wooden chairs, chaise lounges, and recliners for providing a dry and comfortable material upon which the individual can sit, lie or repose for relaxation and rest. When not in use the multi-purpose leisure and recreation accessory 10 can be folded up and then functions as a bag that can be easily carried on one's shoulder.

As shown in FIGS. 1-6, the multi-purpose leisure and recreation accessory 10 of the present invention is more specifically a multi-purpose combination beach bag and beach mat 14 that provides for the convenient consolidation of the aforedescribed items in one handy carrying device. The combination beach bag and beach mat 14 is preferably composed of a fabric material that has body to it, such as a quilted fabric, and is durable, washable, and also comfortable for the individual 12 to sit or recline upon. A preferred dimension of the combination beach bag and beach mat 14 is 86 inches in length by 21 inches in width.

Figure 1:
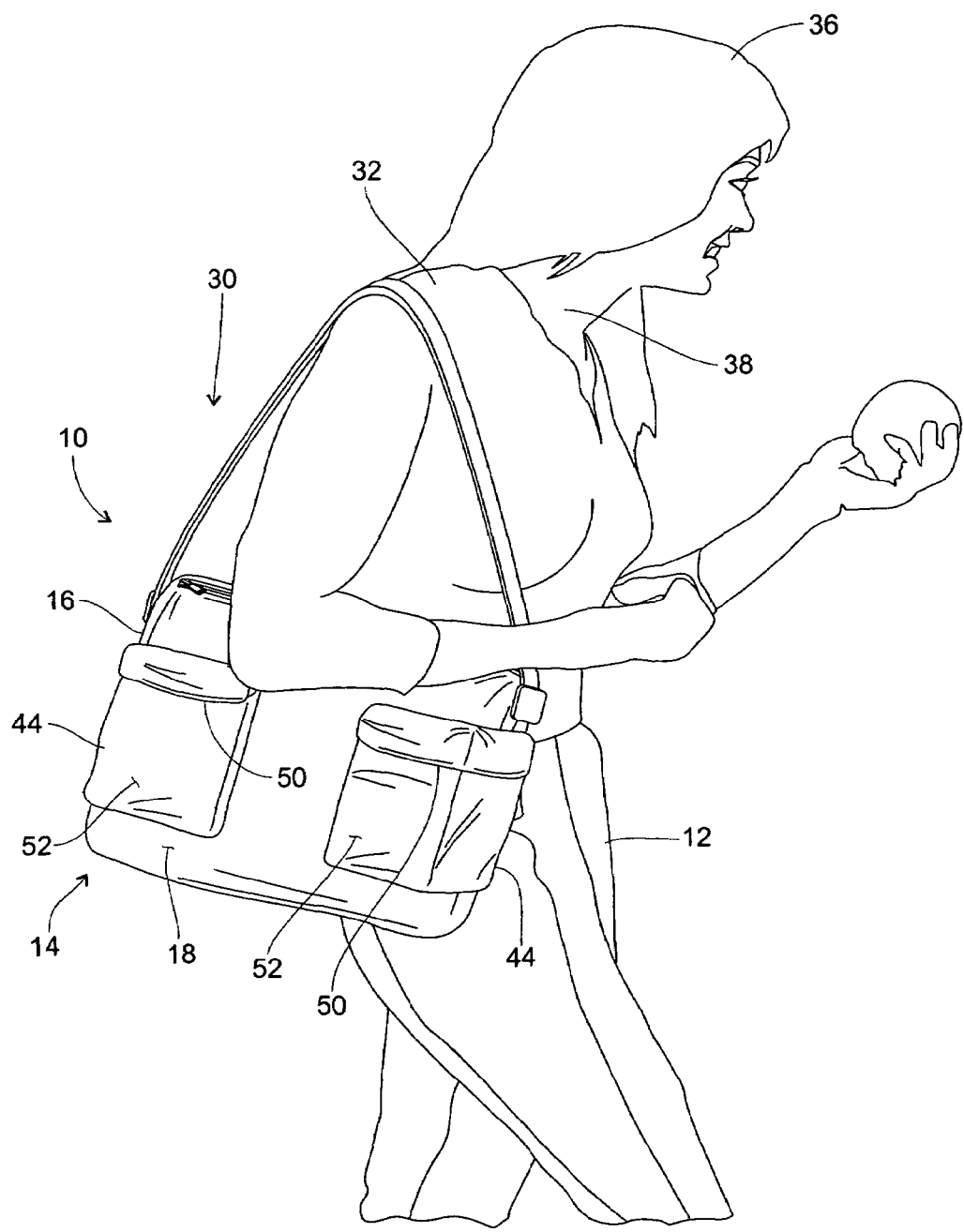
FIG. 1 is a perspective view of the combination beach bag and beach mat of the present invention with the beach mat folded up in the beach bag so that the individual can transport the combination beach bag and beach mat by the carrying strap.
Figure 2:
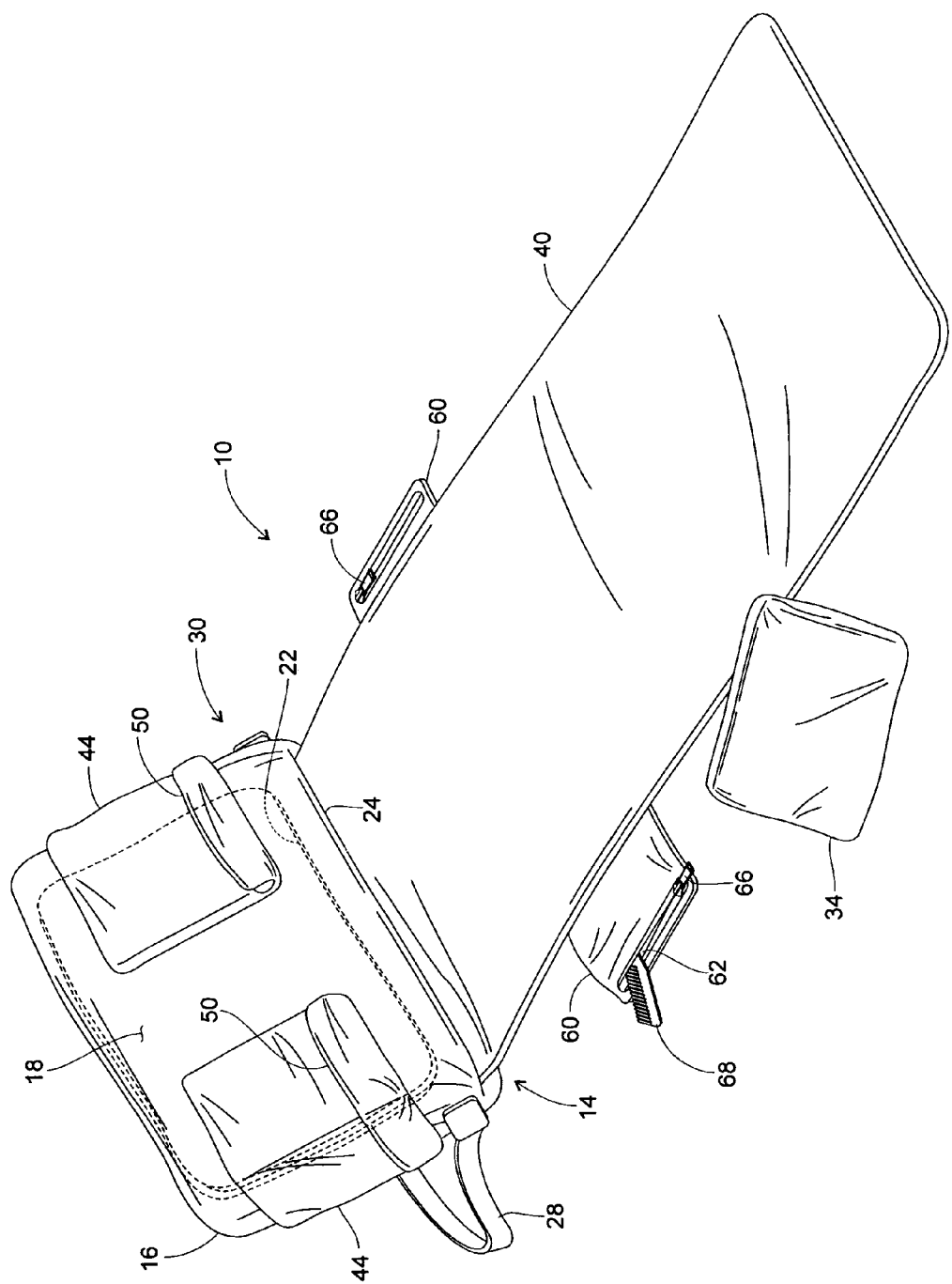
FIG. 2 is perspective view of the combination beach bag and beach mat of the present invention illustrating the beach mat unfolded from the beach bag so that the adjunct pouches are displayed and a towel is shown sitting beside the beach mat.
Figure 3:
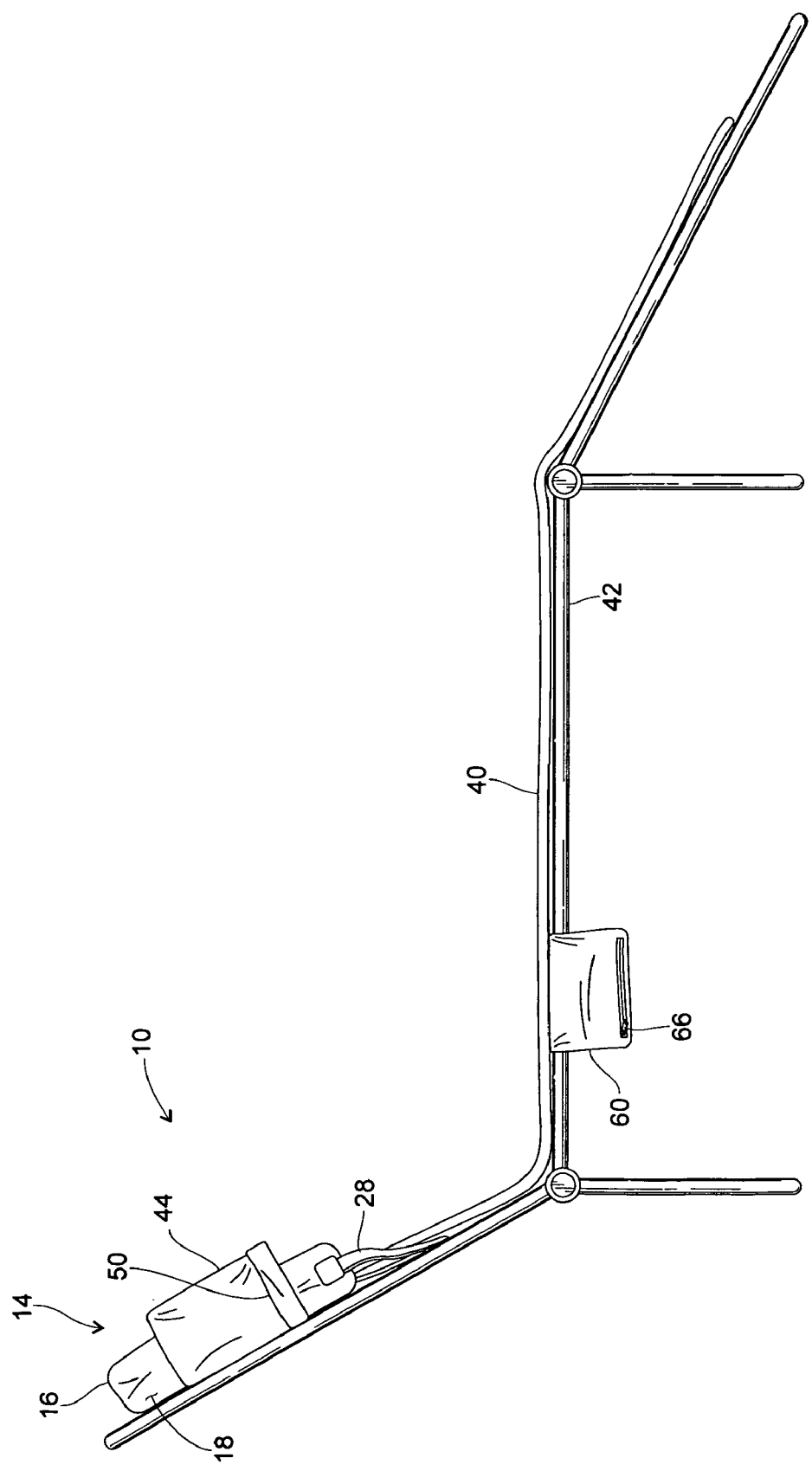
FIG. 3 is a side elevational view of the combination beach bag and beach mat of the present invention illustrating the beach mat unfolded and draped upon a chaise lounge with the towel disposed in the beach bag for comfortably supporting the individual's head.
Figure 4:
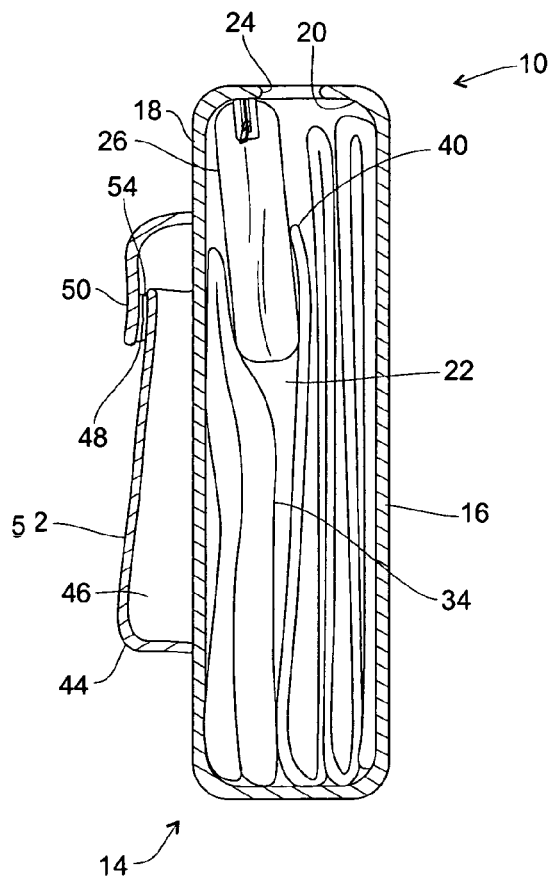
FIG. 4 is a sectioned elevational view of the combination beach bag and beach mat of the present invention illustrating the disposition of the beach mat and the towel stored within the beach bag and one non-insulated secondary pouch integrally attached to the beach bag.
Figure 5:
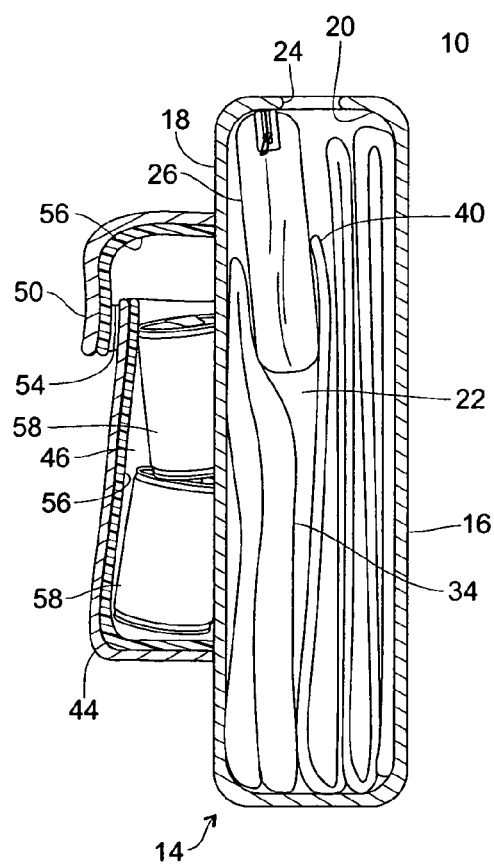
FIG. 5 is a sectioned elevational view of the combination beach bag and beach mat of the present invention illustrating the disposition of the beach mat and the towel stored within the beach bag and one insulated secondary pouch containing several soft drink cans.

The multi-use combination beach bag and beach mat 14, as illustrated in FIGS. 1-6, includes a generally rectangular-shaped upper storage section or portion 16 that functions as both a support for one's head and neck and as a container or bag for any of the aforementioned personal items and belongings. The upper storage section 16 is generally rectangular-shaped and includes a continuous external surface 18 and a continuous internal surface 20. The internal surface 20 defines an inner storage compartment or cavity 22. The upper storage section 16 also includes a deployment slot 24 that registers with the inner storage cavity 22 for allowing passage therethrough of the previously described items for storage within the inner storage cavity 22, and, in addition, elements hereinafter further described. The deployment slot 24 substantially extends across the width of the upper storage section 16. In FIGS. 4 and 5, a wallet 26 is shown as the representative item being stored within the inner storage compartment 22. A carrying strap 28 is attached to the external surface 18 of the upper storage section 16, so that the upper storage section 16 in effect functions as a shoulder-carried beach bag 30 for the storage and transport of the various aforementioned items. The carrying strap 30 is placed over the individual's shoulder 32, as shown in FIG. 1, for easily carrying and transporting the leisure and beach accessory 10 thereupon.

As shown in FIGS. 2, 4 and 5, a towel 34 is also stored within the inner storage compartment 22 and can come with the combination beach bag and beach mat 14. The design, colors and theme of the towel 34 can match that of the combination beach bag and beach mat 14, and the towel 34 can be left within the upper storage section 16 so that the upper storage section 16 serves as a support and pillow for the individual's head 36 and neck 38. The towel 34 can be removed for other uses as desired.

As illustrated in FIGS. 2-6, a beach mat 40 is integrally attached to the upper storage section 16 for containment within the inner storage cavity 22 and for drawing out and unfolding therefrom so that the beach mat 40 can be placed upon a surface, such as a beach, or various types of chairs and recliners, such as for example the pool recliner 42 shown in FIG. 3. The elongated, generally rectangular-shaped beach mat 40 is integrally attached to the inner surface 20 of the upper storage section 16, and is unfolded and drawn out through the deployment slot 24, as shown in FIG. 1, for disposition on the beach or pool recliner 42; and when not being used, the beach mat 40 is rolled up for compact storage within the inner storage cavity 22 of the upper storage section 16.

In addition to the upper storage section 16 having the ability to store items such as the towel 34 and the wallet 26 shown in FIGS. 2 and 4-6, the multi-purpose leisure and beach accessory 10 of the present invention also includes a plurality of adjunct pockets or pouches for storage of the above described items. More specifically, as shown in FIGS. 1-6, a pair of secondary pouches or pockets 44 is mounted to the external surface 18 of the upper storage section 16. Each secondary pouch 44 includes an internal storage compartment 46 for the storage therein of items, an opening 48 registering with the internal storage compartment 46, a flap 50 for closing the opening 48, and a securement and closure means attached to both the flap 50 and the external surface 52 of the secondary pouch 44. The closure means is preferably hook and loop fasteners 54 such as those known by the trademark VELCRO r. The secondary pouches 44 can be either non-insulated as shown in FIG. 4, or the secondary pouches 44 can be insulated with insulation material or fabric 56, as shown in FIG. 5, that lines the internal storage compartment 46 for keeping items, such as the beverage containers 58 shown in FIG. 5 as the representative storage item, cold or reasonably cold for a given time period such as the several hours a family may spend on the beach. In addition to the secondary pouches 44 shown in FIGS. 1, 2 and 4-6, one pair of side pouches or pockets 60 are flexibly secured to either side of the beach mat 40. Each side pouch 60 includes an opening 62 that registers with an internal compartment 64, and a closure means such as a zipper 66.

Figure 6:
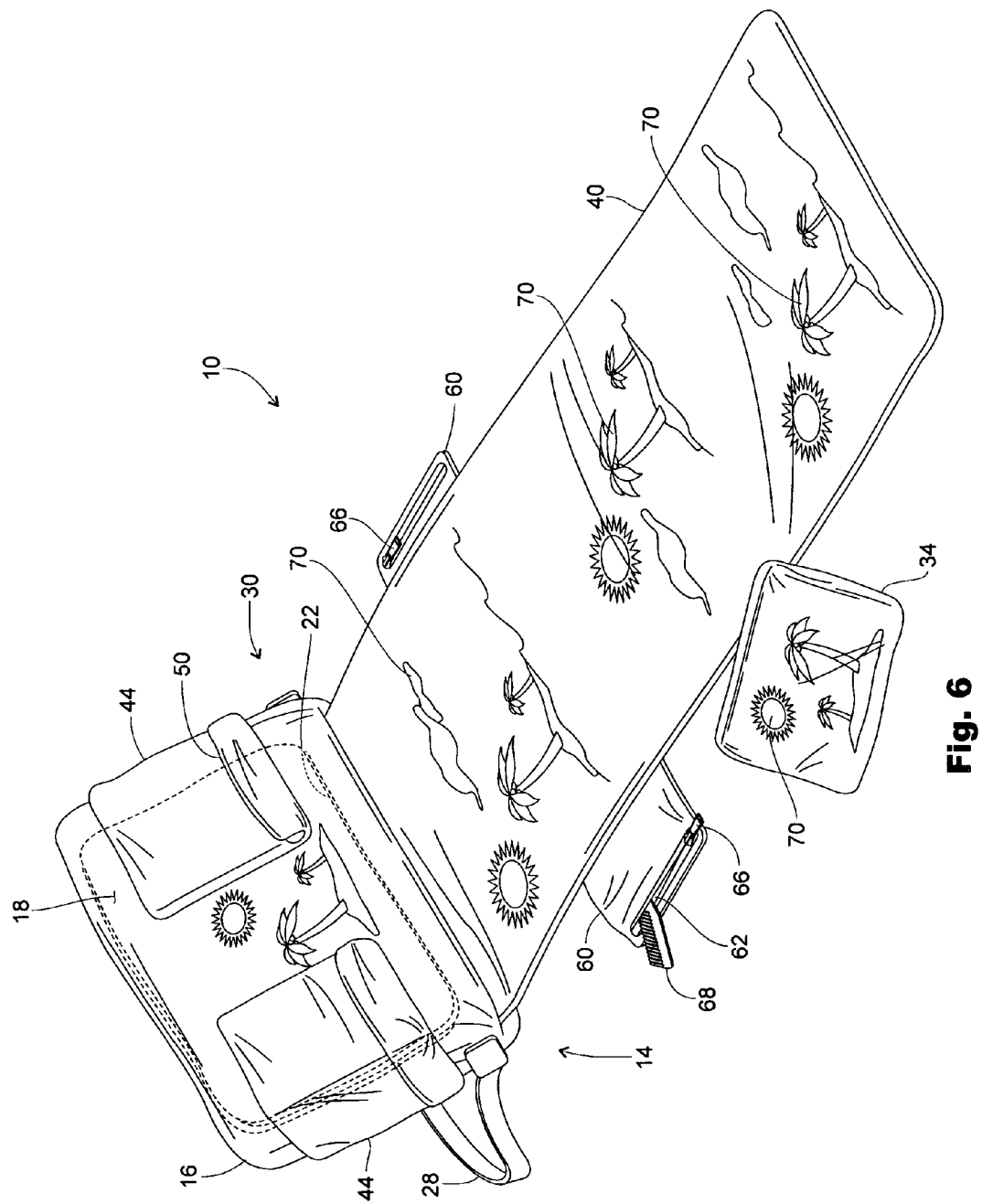
FIG. 6 is a perspective view of the combination beach bag and beach mat of the present invention illustrating a themed design on the beach mat in the form of objects that denote summertime.

The zipper 66 is used to easily and quickly open and close the internal compartment 64 for the storage or removal of the aforedescribed items. In FIGS. 2 and 6 one side pouch 60 is closed and the other side pouch 60 is open for the insertion or removal of a comb 68. The side pouches 60 deploy with the beach mat 40 so that when the beach mat 40 is unfolded from the inner storage cavity 22 of the upper storage section 16 the side pouches 60 deploy as part of and concomitant with the unfolding of the beach mat 40; and the side pouches 60 are enclosed within the inner storage cavity 22 concomitant with the folding and storage of the beach mat 40 therein.

Thus, the combination beach bag and beach mat 14 performs the dual function of storing and transporting items as a shoulder carried beach bag 30 as shown in FIG. 1, and also as a chair cover as shown covering the pool recliner 42 in FIG. 3. Moreover, as shown in FIG. 6, both the upper storage section 16 and the beach mat 40 can be decorated or impressed with various eye catching and striking designs and figures representing, for example, natural, cultural, or seasonal themes. As a representative example of an eye-catching design, FIG. 6 shows the combination beach bag and beach mat 14 decorated with figures 70 denoting a summer or tropical theme that includes sunshine, incoming sea waves, palm trees, and sea gulls.

The foregoing detailed description is to be clearly understood as given by way of illustration and example only and any modifications, alterations, and variations possible to those skilled in the art may be made while remaining within the spirit of the invention and the scope of the appended claims and their equivalents.

What is claimed is:

1. A multi-purpose combination beach bag and beach mat, comprising:

a generally rectangular-shaped upper storage section having a continuous external surface and an internal surface;

an inner storage cavity defined by the internal surface of the upper storage section;

a deployment slot extending across the upper storage section and which registers with the inner storage cavity;

a carrying strap attached to the external surface of the upper surface section;

an elongated mat contained within the inner storage cavity and integrally attached to the upper storage section and capable of being drawn out through the deployment slot for unfolding and use;

a pair of secondary pouches attached to the external surface of the upper storage section with each secondary pouch including an internal storage compartment, a flap and a closure means attached to the flap for closing the internal storage compartment;

a pair of side pockets with each side pocket secured to the opposite sides of the elongated mat and each side pocket including an internal compartment and a zipper for closing and opening the internal compartment; and a towel for storage within the inner storage cavity of the upper storage section with the towel functioning as a pillow when left in the upper storage section and capable of removal from the inner storage cavity for other uses.

2. The multi-purpose combination beach bag and beach mat of claim 1 wherein the external surface of the upper storage section includes decorative designs and figures representative of natural, cultural and seasonal themes.

3. The multi-purpose combination beach bag and beach mat of claim 2 wherein the decorative designs and figures on the external surface of the upper storage section represent a tropical summer theme.

4. The multi-purpose combination beach bag and beach mat of claim 3 wherein the elongated mat includes decorative designs and figures representative of natural, cultural, and seasonal themes.

5. The multi-purpose combination beach bag and beach mat of claim 4 wherein the decorative designs and figures on the elongated mat represent a tropical summer theme.

6. The multi-purpose combination beach bag and beach mat of claim 5 wherein the internal storage compartment of each secondary pouch is lined with an insulation material.

7. The multi-purpose combination beach bag and beach mat of claim 6 wherein the side pockets are flexibly secured to the elongated mat so that the side pockets can be rolled up with the elongated mat for containment within the inner storage cavity and can be unrolled with the elongated mat when the elongated mat is drawn out through the deployment slot.

8. A multi-purpose combination beach bag and beach mat for providing a covering for a chair and a ground surface so that an individual can sit, lie or repose upon, comprising:
a generally rectangular-shaped upper storage section having a continuous external surface and an internal surface;
an inner storage cavity defined by the internal surface of the upper storage section;
a deployment slot extending across the upper storage section and which registers with the inner storage cavity;
a carrying strap attached to the external surface of the upper storage section;
an elongated mat contained within the inner storage cavity and integrally attached to the upper storage section and capable of being drawn out through the deployment slot for disposition on the chair or ground surface;
a pair of secondary pouches attached to the external surface of the upper storage section with each secondary pouch including an internal storage compartment, a flap and a closure means attached to the flap for closing the internal storage compartment;
a pair of side pockets with each side pocket secured to the opposed sides of the elongated mat and each side pocket including an internal compartment and a zipper for closing and opening the internal compartment; and
a towel for storage within the inner storage cavity of the upper storage section with the towel functioning as a pillow when left within the upper storage section and capable of removal from the inner storage cavity for other uses.

9. The multi-purpose combination beach bag and beach mat of claim 8 wherein the external surface of the upper storage section includes decorative designs and figures representative of natural, cultural, or seasonal themes.

10. The multi-purpose combination beach bag and beach mat of claim 9 wherein decorative designs and figures on the external surface of the upper storage section represent a tropical summer theme.

11. The multi-purpose combination beach bag and beach mat of claim 10 wherein the elongated mat includes decorative designs and figures that represent natural, cultural or seasonal themes.

12. The multi-purpose combination beach bag and beach mat of claim 11 wherein the decorative designs and figures on the elongated mat represent a tropical summer theme.

13. The multi-purpose combination beach bag and beach mat of claim 12 wherein the internal storage compartment for each secondary pouch is lined with an insulation material.

14. The multi-purpose combination beach bag and beach mat of claim 13 wherein the side pockets are flexibly secured to the opposed sides of the elongated mat so that the side pockets can be rolled up with the elongated mat for containment within the inner storage cavity and are unrolled with the elongated mat as the elongated mat is drawn out through the deployment slot.

15. A multi-purpose combination beach bag and beach mat for covering a chair and a ground surface so that an individual can sit, lie and relax thereon, comprising:
a generally rectangular-shaped upper storage section having a continuous external surface and an internal surface;
the external surface of the upper storage section including a plurality of decorative designs and figures that represent natural, cultural, and seasonal themes;
the decorative designs and figures on the external surface of the upper storage section including a tropical summer theme as representative of one seasonal theme;
an inner storage cavity defined by the internal surface of the upper storage section;
a deployment slot extending across the upper storage section and which registers with the inner storage cavity;
a carrying strap attached to the external surface of the upper storage section;
an elongated mat contained within the inner storage cavity and integrally attached to the internal surface of the upper storage section and that is capable of being drawn out through the deployment slot for disposition on the chair or the ground surface;
the elongated mat including decorative designs and figures that represent natural, cultural, and seasonal themes;
the decorative designs and figures on the elongated mat including a tropical summer theme as representative of one seasonal theme;
a pair of side pockets flexibly secured to the opposite sides of the elongated mat and each side pocket having an internal compartment and a zipper for closing and opening the internal compartment;
a towel for storage within the inner storage cavity of the upper storage section with the towel functioning as a pillow when kept within the upper storage section and that can be selectively removed from the inner storage cavity for other uses;
a pair of secondary pouches with each secondary pouch secured to the upper storage section and each secondary pouch having an internal storage compartment, a flap and a closure means providing for the closing and opening of the flap; and
whereupon the carrying strap can be placed on the shoulder of the individual so that the upper storage section functions as a portable leisure and recreation bag with the elongated mat and the side pockets being rolled up for containment within the inner storage cavity of the upper storage section.

* * * * *